US012318824B1

(12) United States Patent
Liao et al.

(10) Patent No.: US 12,318,824 B1
(45) Date of Patent: Jun. 3, 2025

(54) EMERGENCY DISPOSAL METHOD AND SYSTEM SUITABLE FOR CONTAMINATED SOIL

(71) Applicant: INSTITUTE OF GEOGRAPHIC SCIENCES AND NATURAL RESOURCES RESEARCH, CAS, Beijing (CN)

(72) Inventors: Xiaoyong Liao, Beijing (CN); You Li, Beijing (CN); Congmao Wang, Beijing (CN); Hongying Cao, Beijing (CN); Chao Xiao, Beijing (CN)

(*) Notice: Subject to any disclaimer, the term of this patent is extended or adjusted under 35 U.S.C. 154(b) by 0 days.

(21) Appl. No.: 18/960,492

(22) Filed: Nov. 26, 2024

(30) Foreign Application Priority Data

Dec. 5, 2023 (CN) .......................... 202311655073.X

(51) Int. Cl.
 *B09C 1/02* (2006.01)
 *B09C 1/08* (2006.01)
 *B09C 1/10* (2006.01)
(52) U.S. Cl.
 CPC .................. *B09C 1/02* (2013.01); *B09C 1/08* (2013.01); *B09C 1/10* (2013.01)
(58) Field of Classification Search
 CPC ................ B09C 1/02; B09C 1/08; B09C 1/10
 See application file for complete search history.

(56) References Cited

U.S. PATENT DOCUMENTS

| | | | | |
|---|---|---|---|---|
| 5,266,494 A | * | 11/1993 | Lahoda | B09C 1/02 588/1 |
| 5,303,871 A | * | 4/1994 | Bateson | B03D 1/16 241/26 |
| 5,507,953 A | * | 4/1996 | Machlitt | B09C 1/02 210/197 |

(Continued)

FOREIGN PATENT DOCUMENTS

| | | |
|---|---|---|
| CN | 104475441 A | 4/2015 |
| CN | 104874599 A | 9/2015 |
| CN | 104889149 A | 9/2015 |

(Continued)

OTHER PUBLICATIONS

Xiong Huilei et al, Engineering Application of Multil-Sieving Soil Washing Equipments in Co-Contaminated Soil Remediation Project, Environmental Engineering, Issue 07, Jul. 31, 2016, pp. 161-170.

(Continued)

*Primary Examiner* — Carib A Oquendo

(57) ABSTRACT

The present invention relates to the technical field of contaminated soil remediation, and in particular to an emergency disposal method and system suitable for contaminated soil, and the system includes a pretreatment unit, a feed weighing unit, a giant-grain soil remediation unit, a fine-grain soil removal unit, a fine-grain soil deep remediation unit, a coarse-grain soil enhanced remediation unit, a waste liquid treatment unit and a dispensing unit. According to the emergency disposal method and system, which takes the (Continued)

traditional leaching remediation technology as a main line and integrates a variety of technical processes with high remediation efficiency, good remediation effects on the soil of different soil types, different contamination types and different contamination levels can be achieved.

4 Claims, 4 Drawing Sheets

(56) References Cited

U.S. PATENT DOCUMENTS

2006/0140725 A1\* 6/2006 Benjamin ................ B09C 1/02
405/128.7

FOREIGN PATENT DOCUMENTS

| | | |
|---|---|---|
| CN | 105414165 A | 3/2016 |
| CN | 111804699 A | 10/2020 |
| CN | 112828025 A | 5/2021 |
| CN | 113732041 A | 12/2021 |
| JP | 2007209826 A | 8/2007 |
| JP | 2014087801 A | 5/2014 |
| WO | 2017071104 A1 | 5/2017 |

OTHER PUBLICATIONS

Luo Zhiyuan, Study on physical and chemical combined remediation of Heavy metal contaminated soil, Environmental Technology, Issue 04, Aug. 31, 2020, pp. 20-23.

\* cited by examiner

EMERGENCY DISPOSAL METHOD AND SYSTEM SUITABLE FOR CONTAMINATED SOIL

CROSS-REFERENCE TO RELATED APPLICATIONS

The present application claims priority to Chinese Patent Application No. 202311655073X, filed on Dec. 5, 2023, the entire disclosure of which is incorporated herein by reference.

TECHNICAL FIELD

The present invention relates to the technical field of contaminated soil remediation, and in particular to an emergency disposal method and system suitable for contaminated soil.

BACKGROUND

In recent years, people's awareness of environmental protection has been gradually strengthened, the environmental protection system tends to be gradually improved, the regulatory strength of environmental protection in key industries has been gradually increased, and the soil environment contamination accidents at enterprises in production have been gradually unveiled, where generally types of contamination are complex and degrees of contamination are different, so these contaminated sites are in urgent need of comprehensive emergency disposal.

At present, domestic traditional soil remediation technologies such as a soil leaching technology, a chemical oxidation technology, curing and stabilizing, a microbial technology and a thermal desorption technology are usually unable to singly cope with comprehensive emergency disposal for the soil of different soil types, different contaminant types and different contamination levels.

The leaching technology is a kind of remediation technology that can deal with organic contaminated soil and heavy metal contaminated soil, but at present, the domestic existing leaching technology is a quantitative reduction technology for washing large particles enriched with contaminants to a lower degree to be qualified, according to the characteristics that different particle sizes of soil are enriched with contaminants to different degrees and smaller particles are enriched with more contaminants. This usually involves adding water and a leaching agent to the system, washing and grading the soil in descending order of particle sizes, and washing the large-grain soil up to the standard. However, when a conventional leaching technology is used to remediate the contaminated soil, the more the content of small particle-sized soil, the more the contaminants that circulate with the system many times, which, on the one hand, results in an increase in the amount of agent added and the amount of wastewater treated, resulting in increased costs; and at the same time, it also results in the difficulty of washing the large-grain soil to be qualified. Therefore, the conventional leaching remediation technology does not have the advantages of cost and effectiveness in soil remediation with a fine-grain soil content exceeding 25%.

Therefore, based on the above reasons, it is necessary to design an emergency disposal method and system suitable for contaminated soil. According to the emergency disposal method and system, which takes the traditional leaching remediation technology as a main line and integrates a variety of technical processes with high remediation efficiency, good remediation effects on the soil of different soil types, different contamination types and different contamination levels can be achieved.

SUMMARY

An objective of the present invention is to overcome deficiencies of the prior art, and an emergency disposal method and system suitable for contaminated soil are provided. According to the emergency disposal method and system, which takes the traditional leaching remediation technology as a main line and integrates a variety of technical processes with high remediation efficiency, good remediation effects on the soil of different soil types, different contamination types and different contamination levels can be achieved.

In order to achieve the above objective, the present invention provides an emergency disposal system suitable for contaminated soil. A pretreatment unit, a feed weighing unit, a giant-grain soil remediation unit, a fine-grain soil removal unit and a coarse-grain soil enhanced remediation unit are sequentially provided according to a soil treatment process; the fine-grain soil removal unit and the coarse-grain soil enhanced remediation unit are respectively further connected to a fine-grain soil deep remediation unit for treatment; waste liquid generated by the fine-grain soil deep remediation unit further enters a waste liquid treatment unit; the coarse-grain soil enhanced remediation unit, the fine-grain soil deep remediation unit and the waste liquid treatment unit are respectively connected to a dispensing unit, and the pretreatment unit is provided with a mixing device and a sieving device according to a working procedure; the feed weighing unit is provided with a feeding device and a weighing device according to the working procedure; the giant-grain soil remediation unit is provided with a grinding and washing device and a sieving device according to the working procedure; and the fine-grain soil deep remediation unit is provided with a dewatering device and an agent mixing device according to the working procedure, the coarse-grain soil enhanced remediation unit is provided with a multi-stage washing device and a multi-stage sieving device according to the working procedure, the waste liquid treatment unit is provided with a waste liquid reaction device, a settling device, a filtering device and an adsorption device according to the working procedure, and the dispensing unit includes a microbial agent, a chemical oxidizing agent, a surfactant, a curing and stabilizing agent, a heavy metal capturing agent, an acid, an alkali, a flocculant and a coagulant aid.

The pretreatment unit, the feed weighing unit, the giant-grain soil remediation unit, the fine-grain soil removal unit, the coarse-grain soil enhanced remediation unit, the fine-grain soil deep remediation unit and the waste liquid treatment unit can perform treatment separately.

The system can select different treatment units and a combination thereof according to different soil contaminants being treated.

A method for treatment of an emergency disposal system suitable for contaminated soil includes the following steps:

S1. homo-mixing the contaminated soil and sieving to remove large debris by the pretreatment unit;

S2. enabling soil to enter the feed weighing unit, precisely quantifying the contaminated soil, and conveying the contaminated soil into the giant-grain soil remediation unit, the giant grain being soil with a particle size greater than 60 mm;

S3. adding circulating water in the giant-grain soil remediation unit to rub and wash the giant-grain soil to effectively remove a small amount of contaminants on the giant-grain soil surface, separating the giant-grain soil that is remediated to be qualified, remediating the total amount of organic matter and heavy metals in the separated giant-grain soil up to the standard, and enabling the slurry to enter the fine-grain soil removal unit;

S4. separating firstly the fine-grain soil enriched with contaminants to a higher degree from the coarse-grain soil with relatively fewer contaminants in advance by the fine-grain soil removal unit, enabling the separated coarse-grain soil to enter the coarse-grain soil enhanced remediation unit, enabling the separated fine-grain soil to enter the fine-grain soil deep remediation unit, and respectively washing the fine-grain soil and the coarse-grain soil independently;

S5. enabling the coarse-grain soil enhanced remediation unit to be provided with a plurality of enhanced washing devices, targetedly adding a remediation agent and circulating water by the dispensing unit to wash the coarse-grain soil in an enhanced manner to effectively remove contaminants on the coarse-grain soil surface, removing the total amount of organic matter and heavy metals in the separated coarse-grain soil, and enabling the separated slurry to enter the fine-grain soil deep remediation unit;

S6. for the slurry that enters the fine-grain soil deep remediation unit after treatment in the S5, separating fine-grain soil sediment from the waste liquid using the principle of filtration and separation, then separating the fine-grain soil sediment with low water content, targetedly adding, according to the type of contaminants, a corresponding remediation agent by the dispensing unit for deep treatment, where the chemical remediation agent or microbial remediation agent is added for organic contaminants, the stabilizing remediation agent is added for heavy metal contaminants, the remediated fine-grain soil is up to the standard and subjected to resource utilization, and the separated waste liquid enters the waste liquid treatment unit; and S7. in the waste liquid treatment unit after the S6 step, according to the type of contaminants in the waste liquid, targetedly adding a chemical oxidizing agent, a heavy metal capturing agent, a flocculant and a coagulant aid by the dispensing unit for agent reaction, removing contaminants from the waste liquid, and recycling the waste liquid after satisfying the requirements for reuse water quality through settling, filtration and adsorption processes after completing the sufficient reaction.

The enhanced washing device in the S4 is an agitator, an ultrasonic wave, a froth flotation and a magnetic separation.

The remediation agent in the S4 is a microbial agent, a chemical oxidizing agent, a surfactant, an acid and an alkali.

Dispensing rules for the dispensing unit are:
selecting the microbial agent for the contaminated soil containing organic contaminants of petroleum hydrocarbons;
selecting the chemical oxidizing agent or alkali for the contaminated soil containing organic contaminants of non-petroleum hydrocarbons;
selecting the curing and stabilizing agent, the heavy metal capturing agent and the acid for the contaminated soil containing heavy metal contaminants; and
selecting the surfactant for a high contaminant concentration in the contaminated soil.

The chemical oxidizing agent is an activated persulfate.

The present invention has the following technical effects.

Through the integration of a traditional sieving technology, a leaching technology, a microbial remediation technology, a chemical oxidizing remediation technology, a curing and stabilizing remediation technology, a wastewater treatment technology and other technologies, the process flow is simple, a single heavy metal contaminated site, a single organic contaminated site, as well as a complex contaminated site can be treated, and good remediation effects for different kinds of contaminants can be achieved.

This technical solution breaks through limitations of the conventional leaching remediation technology that does not have the advantages of cost and effectiveness with a fine-grain soil content exceeding 25%. According to the characteristics that different particle sizes of soil are enriched with contaminants to different degrees, the idea of preferentially removing and then washing the fine-grain soil enriched with contaminants in an enhanced manner is creatively proposed, which greatly improves the effect of contaminant remediation and greatly saves the cost of remediation agent in the link of washing the giant-grain and coarse-grain soil.

Each unit in this technical solution adopts a modularized design, the single unit can be applied separately for different disposal needs, and each unit can achieve the maximum utilization value throughout the working link of soil remediation.

Each unit in this technical solution can achieve free transformation and quick assembly, has a wide application range, and can cope with comprehensive emergency disposal for the soil of different soil types, different contaminant types and different contamination levels, so that a set of system can cope with different types of contaminated soil disposal, thereby greatly reducing the investment in fixed device assets.

DETAILED DESCRIPTION OF THE EMBODIMENTS

Figure 1:
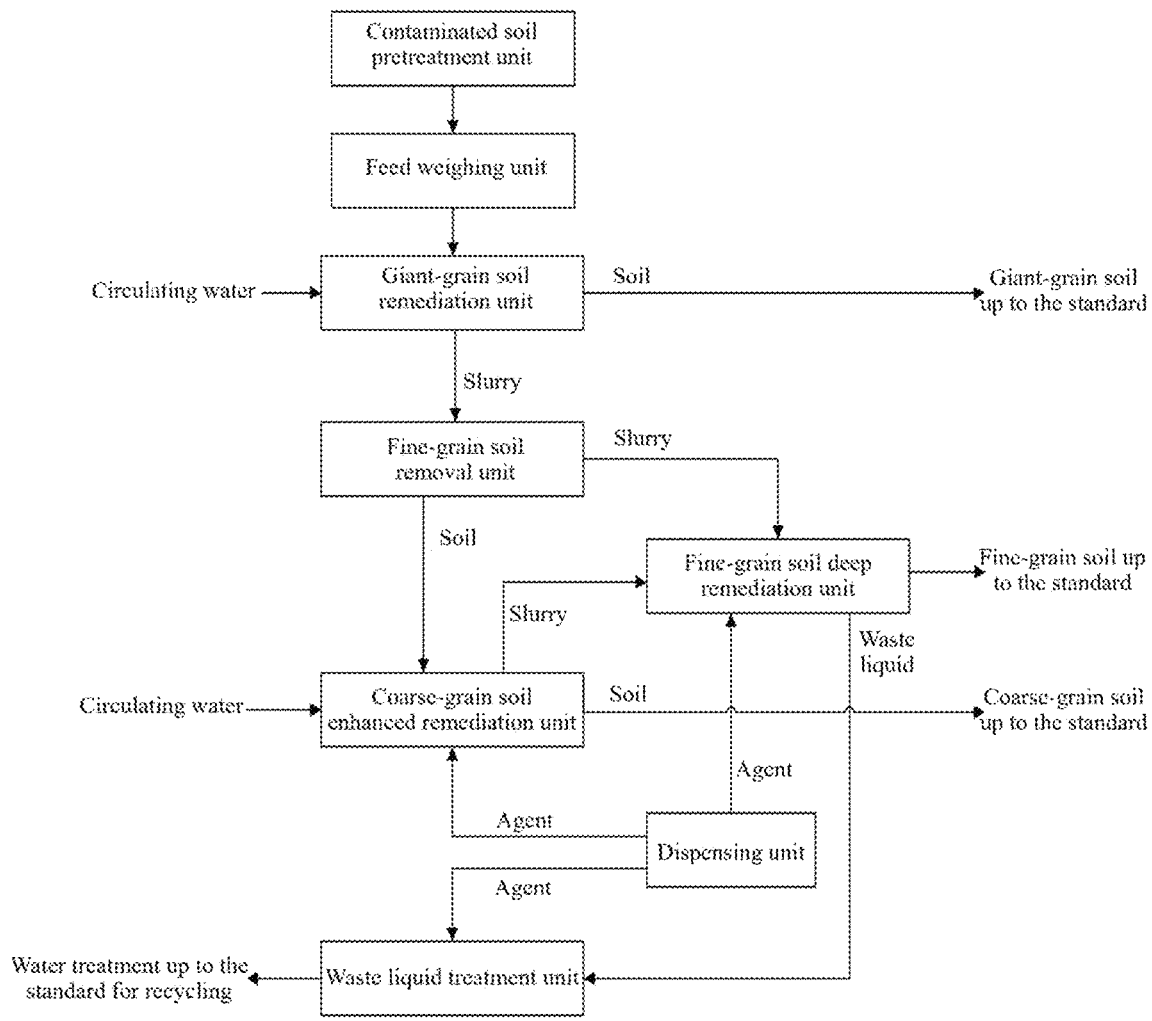
FIG. 1 is a schematic diagram of a contaminated soil treatment process according to a first embodiment combination of the present invention.

Referring to FIGS. 1 to 4, the present invention provides an emergency disposal system suitable for contaminated soil. A pretreatment unit, a feed weighing unit, a giant-grain soil remediation unit, a fine-grain soil removal unit and a coarse-grain soil enhanced remediation unit are sequentially provided according to a soil treatment process; the fine-grain soil removal unit and the coarse-grain soil enhanced remediation unit are respectively further connected to a fine-grain soil deep remediation unit for treatment; waste liquid generated by the fine-grain soil deep remediation unit further enters a waste liquid treatment unit; the coarse-grain soil enhanced remediation unit, the fine-grain soil deep remediation unit and the waste liquid treatment unit are respectively connected to a dispensing unit, and the pretreatment unit is provided with a mixing device and a sieving device according to a working procedure; the feed weighing unit is provided with a feeding device and a weighing device according to the working procedure; the giant-grain soil remediation unit is provided with a grinding and washing device and a sieving device according to the working procedure; and the fine-grain soil deep remediation unit is provided with a dewatering device and an agent mixing device according to the working procedure, the coarse-grain soil enhanced remediation unit is provided with a multi-stage washing device and a multi-stage sieving device according to the working procedure, the waste liquid treatment unit is provided with a waste liquid reaction device, a settling device, a filtering device and an adsorption device according to the working procedure, and the dispensing unit includes a microbial agent, a chemical oxidizing agent, a surfactant, a curing and stabilizing agent, a heavy metal capturing agent, an acid, an alkali, a flocculant and a coagulant aid.

The pretreatment unit, the feed weighing unit, the giant-grain soil remediation unit, the fine-grain soil removal unit, the coarse-grain soil enhanced remediation unit, the fine-grain soil deep remediation unit and the waste liquid treatment unit can perform treatment separately.

The system can select different treatment units and a combination thereof according to different soil contaminants being treated.

The present invention further provides a method for treatment of an emergency disposal system suitable for contaminated soil, including the following steps:

S1. homo-mixing the contaminated soil and sieving to remove large debris by the pretreatment unit;

S2. enabling soil to enter the feed weighing unit, precisely quantifying the contaminated soil, and conveying the contaminated soil into the giant-grain soil remediation unit, the giant grain being soil with a particle size greater than 60 mm;

S3. adding circulating water in the giant-grain soil remediation unit to rub and wash the giant-grain soil to effectively remove a small amount of contaminants on the giant-grain soil surface, separating the giant-grain soil that is remediated to be qualified, remediating the total amount of organic matter and heavy metals in the separated giant-grain soil up to the standard, and enabling the slurry to enter the fine-grain soil removal unit;

S4. separating firstly the fine-grain soil enriched with contaminants to a higher degree from the coarse-grain soil with relatively fewer contaminants in advance by the fine-grain soil removal unit, enabling the separated coarse-grain soil to enter the coarse-grain soil enhanced remediation unit, enabling the separated fine-grain soil to enter the fine-grain soil deep remediation unit, and respectively washing the fine-grain soil and the coarse-grain soil independently, so that the amount of subsequently treated coarse-grain soil and the concentration of containments are reduced, and targeted enhanced remediation of the coarse-grain soil with relatively fewer contaminants and deep concentrated remediation of the fine-grain soil enriched with contaminants can be performed;

S5. enabling the coarse-grain soil enhanced remediation unit to be provided with a plurality of enhanced washing devices, targetedly adding a remediation agent and circulating water by the dispensing unit to wash the coarse-grain soil in an enhanced manner to effectively remove contaminants on the coarse-grain soil surface, removing the total amount of organic matter and heavy metals in the separated coarse-grain soil, and enabling the separated slurry to enter the fine-grain soil deep remediation unit;

S6. for the slurry that enters the fine-grain soil deep remediation unit after treatment in the S5, separating fine-grain soil sediment from the waste liquid using the principle of filtration and separation, then separating the fine-grain soil sediment with low water content, targetedly adding, according to the type of contaminants, a corresponding remediation agent by the dispensing unit for deep treatment, where the chemical remediation agent or microbial remediation agent is added for organic contaminants, the stabilizing remediation agent is added for heavy metal contaminants, the remediated fine-grain soil is up to the standard and subjected to resource utilization, and the separated waste liquid enters the waste liquid treatment unit; and S7. in the waste liquid treatment unit after the S6 step, according to the type of contaminants in the waste liquid, targetedly adding a chemical oxidizing agent, a heavy metal capturing agent, a flocculant and a coagulant aid by the dispensing unit for agent reaction, removing contaminants from the waste liquid, and recycling the waste liquid after satisfying the requirements for reuse water quality through settling, filtration and adsorption processes after completing the sufficient reaction.

The enhanced washing device in the S4 is an agitator, an ultrasonic wave, a froth flotation and a magnetic separation.

The remediation agent in the S4 is a microbial agent, a chemical oxidizing agent, a surfactant, an acid and an alkali.

Dispensing rules for the dispensing unit are:

selecting the microbial agent for the contaminated soil containing organic contaminants of petroleum hydrocarbons;

selecting the chemical oxidizing agent or alkali for the contaminated soil containing organic contaminants of non-petroleum hydrocarbons;

selecting the curing and stabilizing agent, the heavy metal capturing agent and the acid for the contaminated soil containing heavy metal contaminants; and selecting the surfactant for a high contaminant concentration in the contaminated soil.

The chemical oxidizing agent is an activated persulfate.

Combinations of the present invention include:

In a first combination as shown in FIG. 1, for a complex contaminated soil or a single organic contaminated soil with a fine-grain soil content not exceeding 25%, remediation is carried out using all the units in this technical solution.

Figure 4:
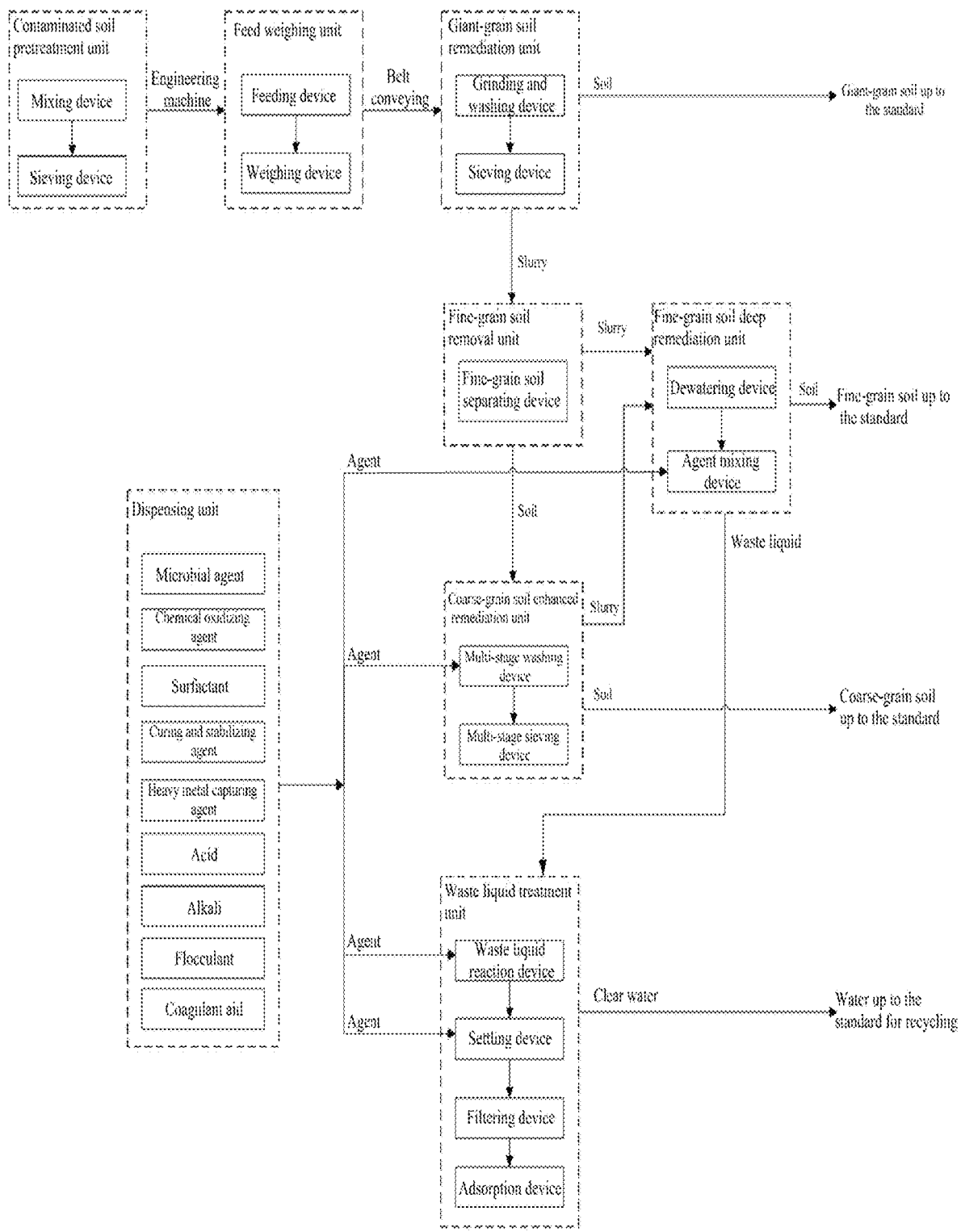
FIG. 4 is a schematic diagram of a treatment process for treating a single heavy metal contaminated soil with a fine-grain soil content exceeding 25% according to the present invention.

In a fourth combination as shown in FIG. 4, for a complex contaminated soil or a single organic contaminated soil with a fine-grain soil content exceeding 25%, remediation is carried out using all the units in this technical solution.

Figure 2:
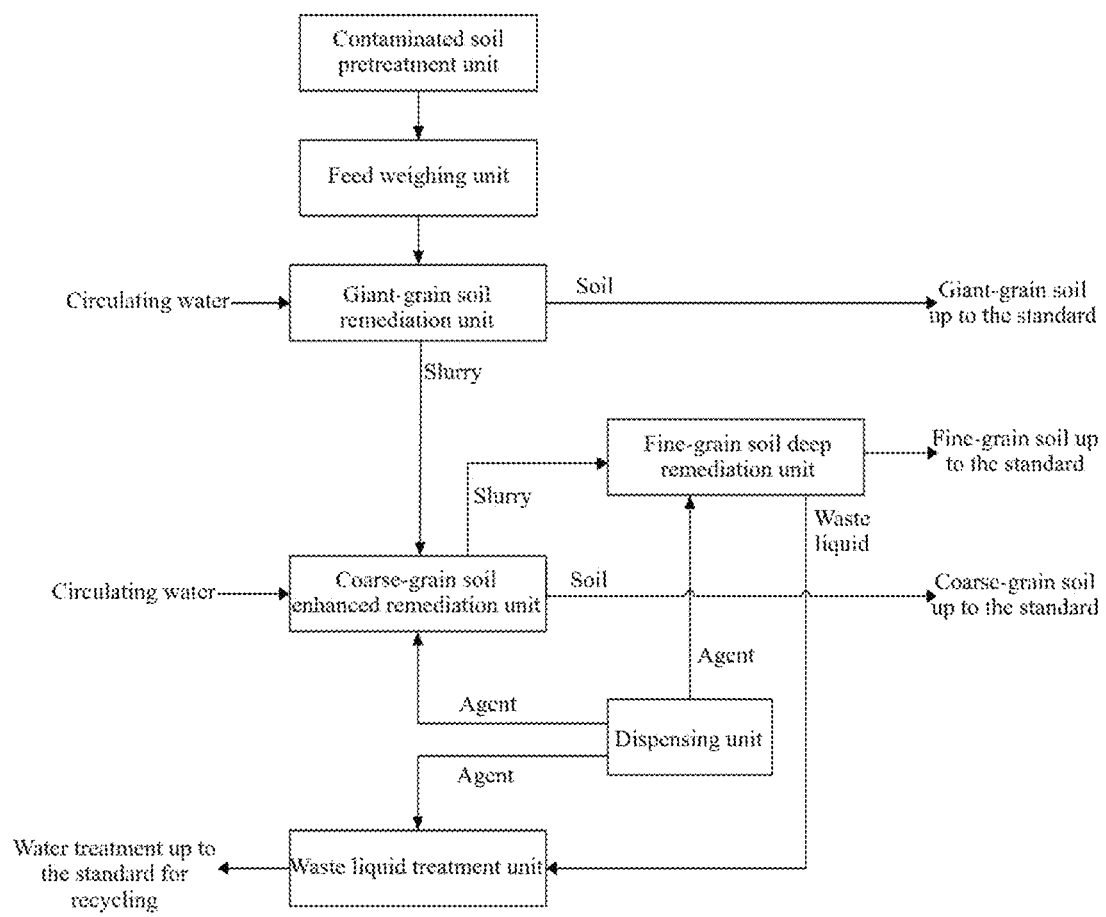
FIG. 2 is a schematic diagram of a contaminated soil treatment process according to a second embodiment combination of the present invention.

In a second combination as shown in FIG. 2, for a working condition of a complex contaminated soil or a single organic contaminated soil with a fine-grain soil content less than 25%, the fine-grain soil is low in content under this working condition, and can be remediated up to the standard without pre-separation. The contaminated soil can sequentially pass through the pretreatment unit, the feed weighing unit, the giant-grain soil remediation unit, the coarse-grain soil enhanced remediation unit, the fine-grain soil deep remediation unit and the waste liquid treatment unit, without configuring the fine-grain soil removal unit.

Figure 3:
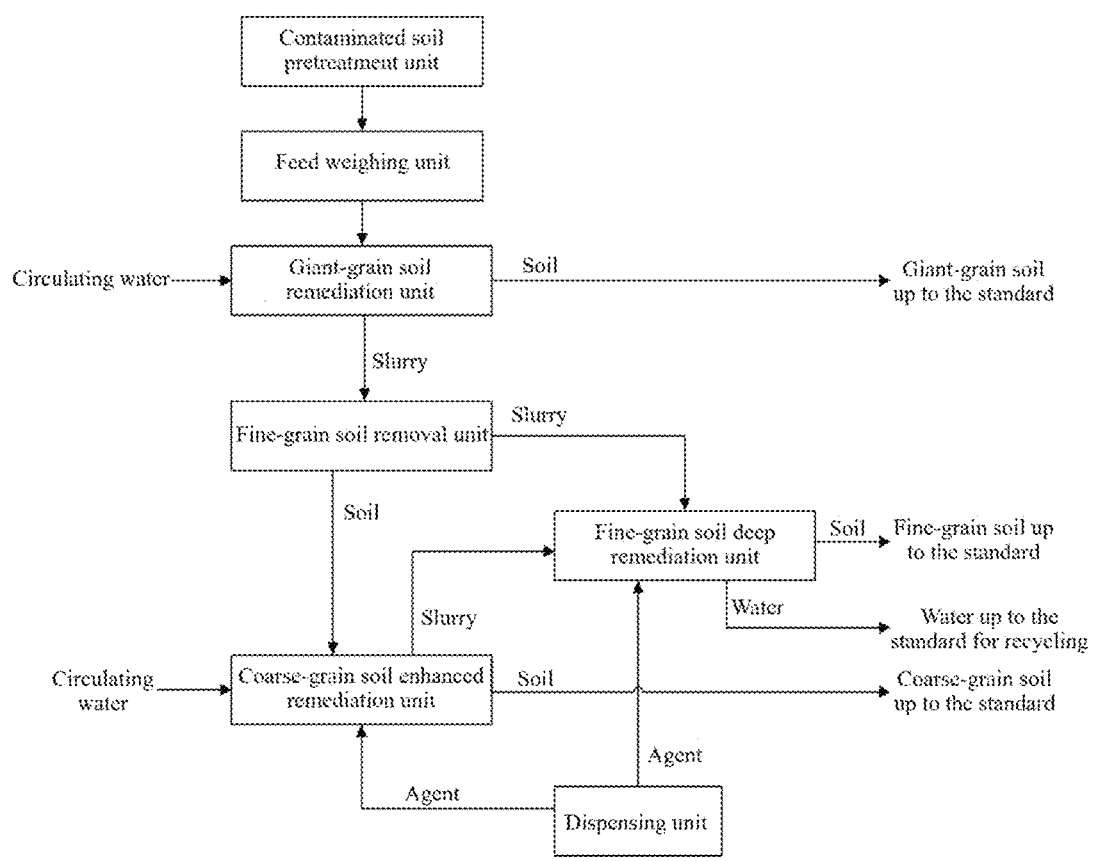
FIG. 3 is a schematic diagram of a contaminated soil treatment process according to a third embodiment combination of the present invention.

In a third combination as shown in FIG. 3, for a single heavy metal contaminated soil type, the contaminated soil sequentially passes through the pretreatment unit, the feed weighing unit, the giant-grain soil remediation unit, the fine-grain soil removal unit, the coarse-grain soil enhanced remediation unit and the fine-grain soil deep remediation unit to be remediated up to the standard, and heavy metal contaminants in the wastewater are effectively removed in the fine-grain soil deep remediation unit, without configuring the waste liquid treatment unit.

The working principle of the present invention is illustrated in terms of treating a complex contaminated soil with a high contaminant concentration.

The pretreatment unit includes a mixing device and a sieving device for homo-mixing the contaminated soil and sieving to remove large debris, and the pre-treated soil is transported to the feed weighing unit using an engineering machine.

The feed weighing unit includes a feeding device, a weighing device and a conveying device, and the contaminated soil is precisely quantified by the feed weighing unit and conveyed into the giant-grain soil remediation unit.

The giant-grain soil remediation unit includes a grinding and washing device, and a sieving device. The larger the soil particles, the smaller their specific surface area, and the fewer the contaminants attached to the soil particle surface, so the giant-grain soil is enriched with contaminants to a lower degree. Adding circulating water in the grinding and washing device is mainly used for rubbing and washing the giant-grain soil to effectively remove a small amount of contaminants on the giant-grain soil surface, and then the giant-grain soil that is remediated to be qualified is separated by the sieving device. The total amount of organic matter and heavy metals in the separated giant-grain soil is removed, and can be backfilled in situ or directly subjected to resource utilization, for example, utilized as construction sand, and backfilled in a road base. The separated slurry enters the fine-grain soil removal unit.

The fine-grain soil removal unit includes a fine-grain soil separating device. The smaller the soil particles, the larger their specific surface area, and the more the contaminants attached to the soil particle surface, thus the fine-grain soil is enriched with contaminants to a higher degree, and the fine-grain soil enriched with contaminants is separated in advance from the coarse-grain soil with relatively fewer contaminants by the fine-grain soil separating device. The separated coarse-grain soil enters the coarse-grain soil enhanced remediation unit, and the separated fine-grain soil enters the fine-grain soil deep remediation unit. In this way, the amount of subsequently treated coarse-grain soil and the concentration of containments are reduced, and targeted enhanced remediation of the coarse-grain soil with relatively fewer contaminants and deep concentrated remediation of the fine-grain soil enriched with contaminants can be performed.

The coarse-grain soil enhanced remediation unit includes a multi-stage enhanced washing device and a sieving and separating device. The agitator, the ultrasonic wave, the froth flotation, the magnetic separation and other enhanced washing devices can be provided in the enhanced washing device, and a remediation agent (an agent such as a microbial agent, a chemical oxidizing agent, a surfactant, an acid and an alkaline) and circulating water can be targetedly added to wash the coarse-grain soil in an enhanced manner, so that contaminants on the coarse-grain soil surface can be removed effectively, and then the coarse-grain soil that is remediated to be qualified can be sieved and separated by the sieving and separating device. The enhanced washing device and the sieving and separating device can set multiple particle-size levels according to characteristics of the coarse-grain soil, for example, the coarse-grain soil can be divided into three particle-size levels, respectively: 60 mm to 6 mm, 6 mm to 1 mm, and 1 mm to 0.075 mm, which are sequentially subjected to enhanced washing as well as sieving and separating. The total amount of organic matter and heavy metals in the separated coarse-grain soil is removed, and can be backfilled in situ or directly subjected to resource utilization, for example, utilized as construction sand, and backfilled in a road base. The separated slurry enters the fine-grain soil deep remediation unit.

The fine-grain soil deep remediation unit includes a dewatering device and an agent deep mixing device. The dewatering device separates the fine-grain soil (sediment) from the waste liquid using the principle of filtration and separation, the separated fine-grain soil (sediment) enters the agent deep mixing device, and a corresponding remediation agent can be targetedly added in the agent deep mixing device according to the type of contaminants for deep treatment. The chemical remediation agent or microbial remediation agent can be added for organic contaminants and the stabilizing remediation agent can be added for heavy metal contaminants, so that the remediated fine-grain soil is up to the standard and can be subjected to resource utilization; and the separated waste liquid enters the waste liquid treatment unit.

The waste liquid treatment unit includes a waste liquid reaction device, a settling device and a filtering device. In the waste liquid reaction device, a chemical oxidizing agent, a heavy metal capturing agent, a flocculant, a coagulant aid, etc. can be targetedly added according to the type of contaminants in the waste liquid, the waste liquid sequentially enters the settling device, the filtering device and the adsorption device after completing the sufficient reaction, contaminants are removed from the waste liquid through settling and separation, filtration and adsorption, and the waste liquid is recycled.

A microbial agent, a chemical oxidizing agent, a surfactant, a curing and stabilizing agent, a heavy metal capturing agent, an acid, an alkali, a flocculant, a coagulant aid and so on can be configured in the dispensing unit, and the configured agent can be targetedly added to the soil enhanced remediation unit, the fine-grain soil deep remediation unit, and the waste liquid reaction device in the waste liquid treatment unit.

A preferred suitable microbial agent is added to the system for the contaminated soil containing organic contaminants of petroleum hydrocarbons; a preferred suitable chemical oxidizing agent (e.g., an activated persulfate) and an alkali are added to the system for the contaminated soil containing organic contaminants of non-petroleum hydrocarbons; a preferred suitable curing and stabilizing agent, a heavy metal capturing agent and an acid are added to the system for the contaminated soil containing heavy metal contaminants; and a preferred suitable surfactant is added to the system for a high contaminant concentration in the contaminated soil.

The above is only a preferred embodiment of the present invention, which is only used to help understand the method of the present application and its core ideas, the protection scope of the present invention is not limited to the above embodiments, and all technical solutions under the ideas of the present invention belong to the protection scope of the present invention. It should be noted that those of ordinary skill in the art can make a plurality of improvements and modifications without departing from the principles of the present invention, and such modifications and modifications shall be construed to fall into the scope of the disclosure.

The present invention fundamentally solves the problems of high treatment cost and low efficiency of the conventional leaching remediation technology in the existing technology when the content of the fine-grain soil exceeds 25%, and various other remediation technologies are unable to singly cope with the comprehensive emergency disposal for the soil of different soil types, different contaminant types and different contamination levels. The emergency disposal method and system, which takes the traditional leaching remediation technology as a main line and integrates a variety of technical processes with high remediation efficiency, enable good remediation effects on the soil of different soil types, different contamination types and different contamination levels, have lower cost, include a variety of combination ways, and have a wider application range.

What is claimed is:

1. A method for treatment of an emergency disposal system suitable for contaminated soil,
    wherein then emergency disposal system suitable for contaminated soil comprises a pretreatment unit, a feed weighing unit, a giant-grain soil remediation unit, a fine-grain soil removal unit and a coarse-grain soil enhanced remediation unit sequentially provided according to a soil treatment process;
    wherein the fine-grain soil removal unit and the coarse-grain soil enhanced remediation unit are respectively further connected to a fine-grain soil deep remediation unit for treatment;
    waste liquid generated by the fine-grain soil deep remediation unit further enters a waste liquid treatment unit;
    the coarse-grain soil enhanced remediation unit, the fine-grain soil deep remediation unit and the waste liquid treatment unit are respectively connected to a dispensing unit, and the pretreatment unit is provided with a mixing device and a sieving device according to a working procedure;
    the feed weighing unit is provided with a feeding device and a weighing device according to the working procedure;
    the giant-grain soil remediation unit is provided with a grinding and washing device and a sieving device according to the working procedure;
    the fine-grain soil deep remediation unit is provided with a dewatering device and an agent mixing device according to the working procedure; the coarse-grain soil enhanced remediation unit is provided with a multi-stage washing device and a multi-stage sieving device according to the working procedure, the waste liquid treatment unit is provided with a waste liquid reaction device, a settling device, a filtering device and an adsorption device according to the working procedure, and the dispensing unit comprises a microbial agent, a chemical oxidizing agent, a surfactant, a curing and stabilizing agent, a heavy metal capturing agent, an acid, an alkali, a flocculant and a coagulant aid;
    the pretreatment unit, the feed weighing unit, the giant-grain soil remediation unit, the fine-grain soil removal unit, the coarse-grain soil enhanced remediation unit, the fine-grain soil deep remediation unit and the waste liquid treatment unit are capable of performing treatment separately;
    the system is capable of selecting different treatment units and a combination thereof according to different soil contaminants being treated;
    the coarse-grain soil enhanced remediation unit comprises a multi-stage enhanced washing device and a sieving and separating device; the enhanced washing device and the sieving and separating device are capable of setting multiple particle-size levels according to characteristics of the coarse-grain soil; the coarse-grain soil is divided into three particle-size levels, respectively: 60 mm to 6 mm, 6 mm to 1 mm, and 1 mm to 0.075 mm, which are sequentially subjected to enhanced washing as well as sieving and separating; and
    the giant grain is soil with a particle size greater than 60 mm;
    wherein the method comprises:
    S1. homo-mixing the contaminated soil and sieving to remove large debris by the pretreatment unit;
    S2. enabling soil to enter the feed weighing unit, precisely quantifying the contaminated soil, and conveying the contaminated soil into the giant-grain soil remediation unit, the giant grain being soil with a particle size greater than 60 mm;
    S3. adding circulating water in the giant-grain soil remediation unit to rub and wash the giant-grain soil to effectively remove a small amount of contaminants on the giant-grain soil surface, separating the giant-grain soil that is remediated to be qualified, remediating the total amount of organic matter and heavy metals in the separated giant-grain soil up to the standard, and enabling the slurry to enter the fine-grain soil removal unit;
    S4. separating firstly the fine-grain soil enriched with contaminants to a higher degree from the coarse-grain soil with relatively fewer contaminants in advance by the fine-grain soil removal unit, enabling the separated coarse-grain soil to enter the coarse-grain soil enhanced remediation unit, enabling the separated fine-grain soil to enter the fine-grain soil deep remediation unit, and respectively washing the fine-grain soil and the coarse-grain soil independently;
    S5. enabling the coarse-grain soil enhanced remediation unit to be provided with a plurality of enhanced washing devices, targetedly adding a remediation agent and circulating water by the dispensing unit to wash the coarse-grain soil in an enhanced manner to effectively remove contaminants on the coarse-grain soil surface, removing the total amount of organic matter and heavy metals in the separated coarse-grain soil, and enabling the separated slurry to enter the fine-grain soil deep remediation unit;
    S6. for the slurry that enters the fine-grain soil deep remediation unit after treatment in the S5, separating fine-grain soil sediment from the waste liquid using the principle of filtration and separation, then separating the fine-grain soil sediment with low water content, targetedly adding, according to the type of contaminants, a corresponding remediation agent by the dispensing unit for deep treatment, wherein the chemical remediation agent or microbial remediation agent is added for organic contaminants, the stabilizing remediation agent is added for heavy metal contaminants, the remediated fine-grain soil is up to the standard and subjected to resource utilization, and the separated waste liquid enters the waste liquid treatment unit; and
    S7. in the waste liquid treatment unit after the S6 step, according to the type of contaminants in the waste liquid, targetedly adding a chemical oxidizing agent, a heavy metal capturing agent, a flocculant and a coagulant aid by the dispensing unit for agent reaction, removing contaminants from the waste liquid, and recycling the waste liquid after satisfying the requirements for reuse water quality through settling, filtration and adsorption processes after completing the sufficient reaction, wherein the enhanced washing device in the S4 is an agitator, an ultrasonic wave, a froth flotation and a magnetic separation.

2. The method for treatment of claim 1, wherein the remediation agent in the S4 is a microbial agent, a chemical oxidizing agent, a surfactant, an acid and an alkali.

3. The method for treatment of claim 1, wherein dispensing rules for the dispensing unit are:

selecting the microbial agent for the contaminated soil containing organic contaminants of petroleum hydrocarbons;

selecting the chemical oxidizing agent or alkali for the contaminated soil containing organic contaminants of non-petroleum hydrocarbons;

selecting the curing and stabilizing agent, the heavy metal capturing agent and the acid for the contaminated soil containing heavy metal contaminants; and selecting the surfactant for a high contaminant concentration in the contaminated soil.

4. The method for treatment of claim 3, wherein the chemical oxidizing agent is an activated persulfate.

\* \* \* \* \*